(12) United States Patent
Gonella

(10) Patent No.: US 10,233,960 B2
(45) Date of Patent: Mar. 19, 2019

(54) WIRING UNIT FOR GROOVED BARS PROVIDED WITH A T-SHAPED RECESS

(71) Applicant: LAFER S.R.L., Meledo di Sarego (VI) (IT)

(72) Inventor: Giampaolo Gonella, Brendola (IT)

(73) Assignee: Lafer S.R.L., Meledo di Sarego (VI) (IT)

( * ) Notice: Subject to any disclaimer, the term of this patent is extended or adjusted under 35 U.S.C. 154(b) by 0 days.

(21) Appl. No.: 15/560,413

(22) PCT Filed: Apr. 1, 2016

(86) PCT No.: PCT/IB2016/051877
§ 371 (c)(1),
(2) Date: Sep. 21, 2017

(87) PCT Pub. No.: WO2016/157147
PCT Pub. Date: Oct. 6, 2016

(65) Prior Publication Data
US 2018/0066696 A1    Mar. 8, 2018

(30) Foreign Application Priority Data
Apr. 3, 2015 (IT) ................. VI2015A0094

(51) Int. Cl.
*F16B 37/04* (2006.01)
*F16B 7/18* (2006.01)
*F16L 3/12* (2006.01)

(52) U.S. Cl.
CPC ............ *F16B 37/046* (2013.01); *F16B 7/187* (2013.01); *F16B 37/04* (2013.01); *F16L 3/12* (2013.01)

(58) Field of Classification Search
CPC .. F16B 7/18; F16B 7/187; F16B 37/04; F16B 37/044; F16B 37/045; F16B 37/046; F16B 41/00; F16B 43/00; F16L 3/12
(Continued)

(56) References Cited

U.S. PATENT DOCUMENTS 2,163,446 A * 6/1939 Heckman ............ E04B 1/4135
411/399
3,456,706 A * 7/1969 Ollis, Jr. ................. F16B 37/04
411/84
(Continued)

FOREIGN PATENT DOCUMENTS

| DE | 87 12 171 U1 | 1/1988 |
| FR | 2 719 093 A1 | 10/1995 |
| GB | 2 461 621 A | 1/2010 |

OTHER PUBLICATIONS

International Search Report and Written Opinion dated Jul. 7, 2016, issued in PCT Application No. PCT/IB2016/051877, filed Apr. 1, 2016.

*Primary Examiner* — Roberta S Delisle
(74) *Attorney, Agent, or Firm* — Workman Nydegger

(57) ABSTRACT

A cabling unit for connecting electrical devices to power supply bus bars having a longitudinal cavity accessible through a longitudinal slot includes: a screw with a hammer head and a threaded shank provided with two lateral reliefs; a shaped casing configured to be received in the longitudinal cavity, in which there is identified a shaped housing configured to receive the hammer head, an elastic bottom and a through opening for the threaded shank. The elastic bottom counteracts the bottom of the longitudinal cavity and pushes the underhead surface of the hammer head against the inner wall of the longitudinal cavity opposite to the bottom and constrains the screw to the power supply bus bar when a rotation imparted to the screw arranges the hammer head
(Continued)

transversely to the longitudinal slot. The shaped casing is provided with counteracting structure configured to cooperate with the lateral reliefs and prevent the counter-rotation of the screw when the hammer head is arranged transversely to the shaped casing and the longitudinal slot.

11 Claims, 6 Drawing Sheets

(58) Field of Classification Search
USPC .......................................................... 411/85
See application file for complete search history.

(56) References Cited

U.S. PATENT DOCUMENTS

| | | | | |
|---|---|---|---|---|
| 4,545,697 | A * | 10/1985 | Verdenne | F16B 37/042 403/106 |
| 5,078,537 | A * | 1/1992 | Nomura | F16B 37/046 403/21 |
| 5,779,412 | A * | 7/1998 | Nagai | E04B 2/766 411/104 |
| 5,803,687 | A * | 9/1998 | Ledingham | B65G 21/2072 198/836.3 |
| 7,073,995 | B2 * | 7/2006 | Herb | F16B 37/046 411/104 |
| 7,604,444 | B2 * | 10/2009 | Wu | F16B 37/046 411/104 |
| 2002/0078657 | A1 * | 6/2002 | Zambelli | E04B 1/043 52/710 |
| 2003/0185643 | A1 * | 10/2003 | Thompson | F16B 37/046 411/85 |

* cited by examiner

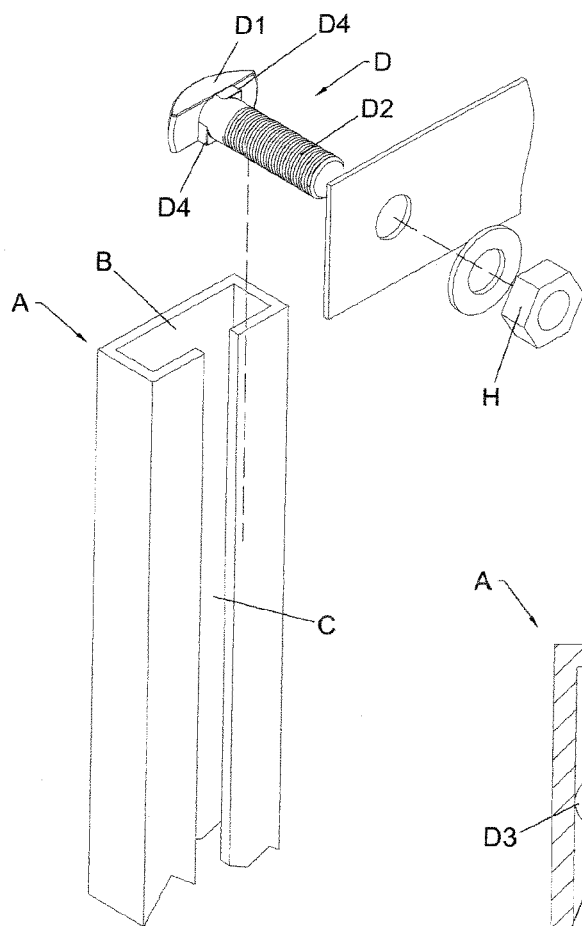
Fig.1 - Prior art
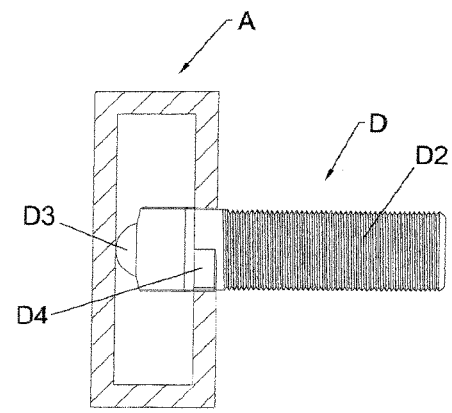
Fig.2 - Prior art
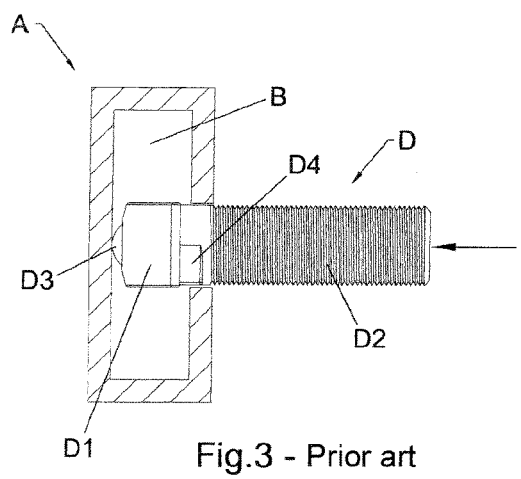
Fig.3 - Prior art
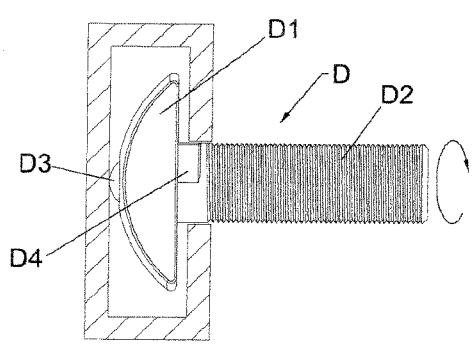
Fig.4 - Prior art
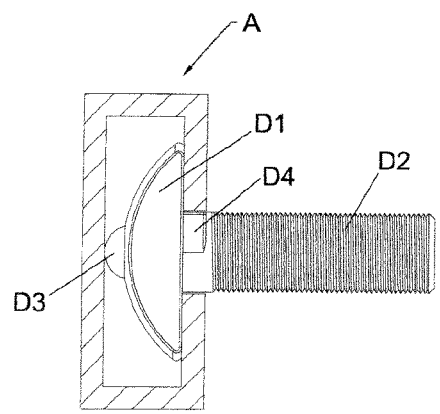
Fig.5 - Prior art

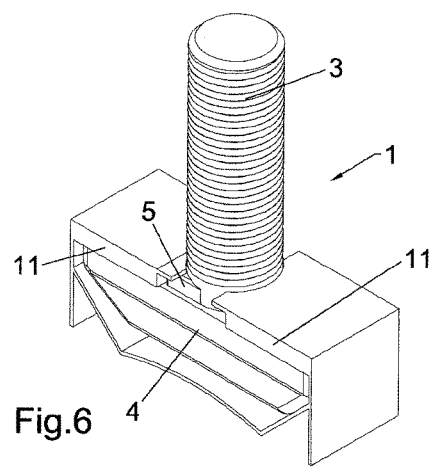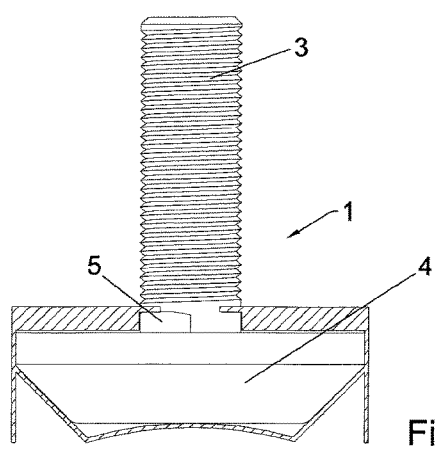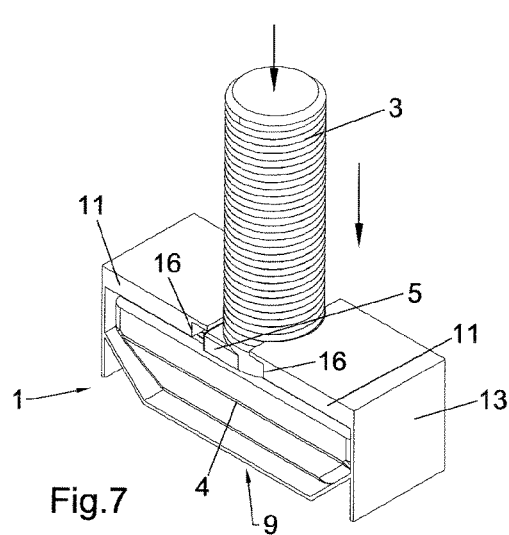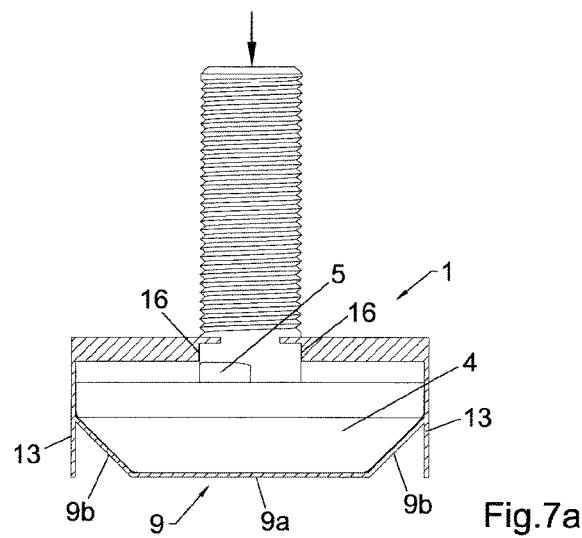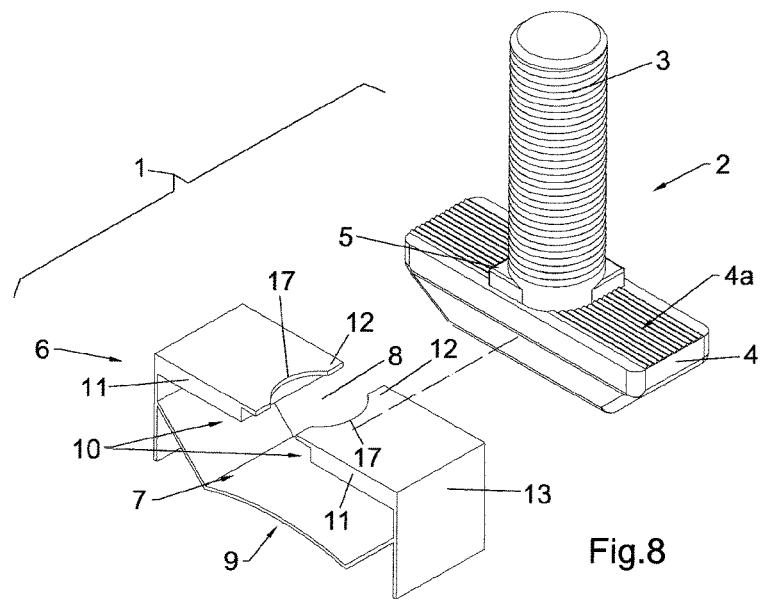

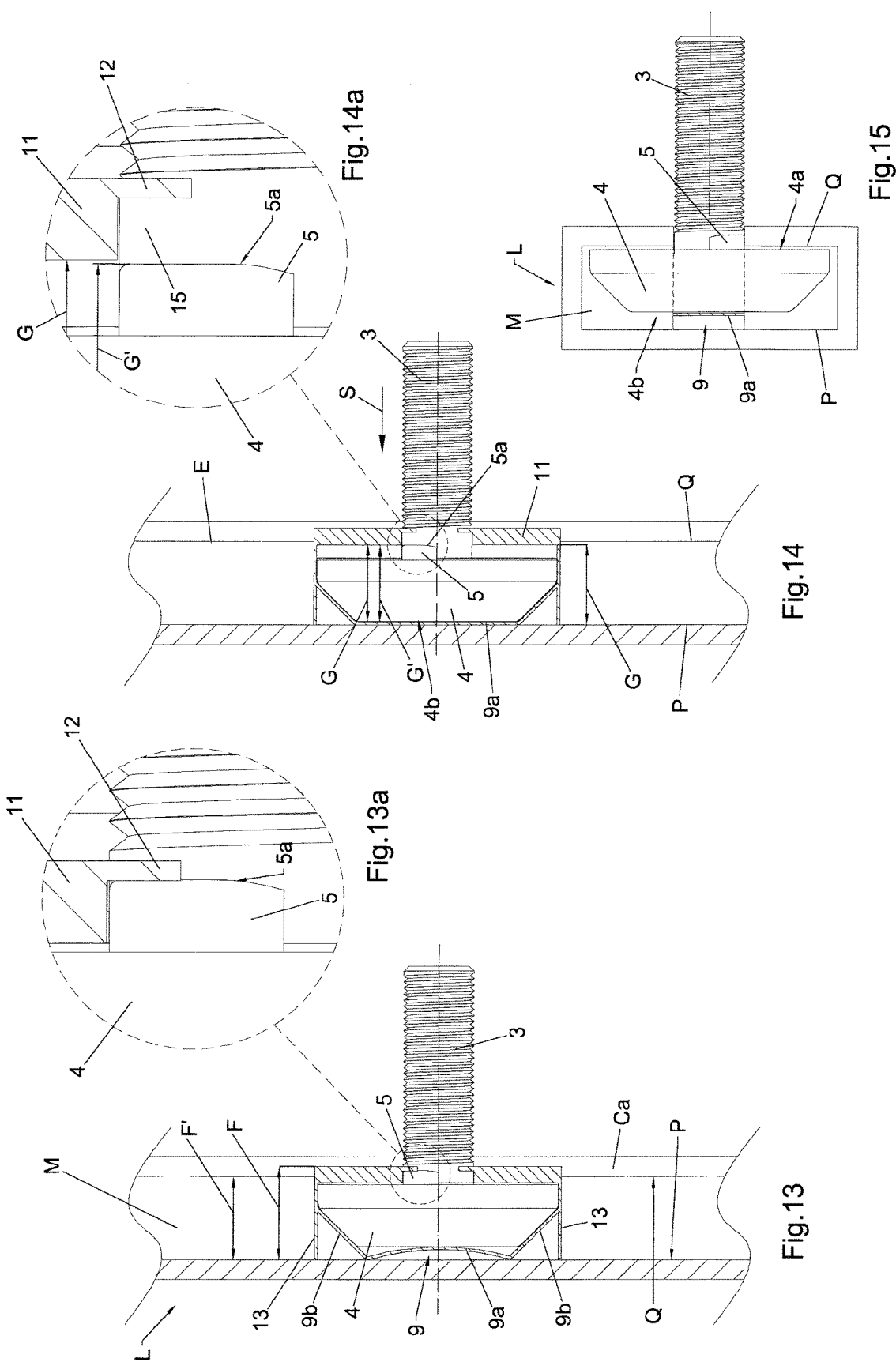

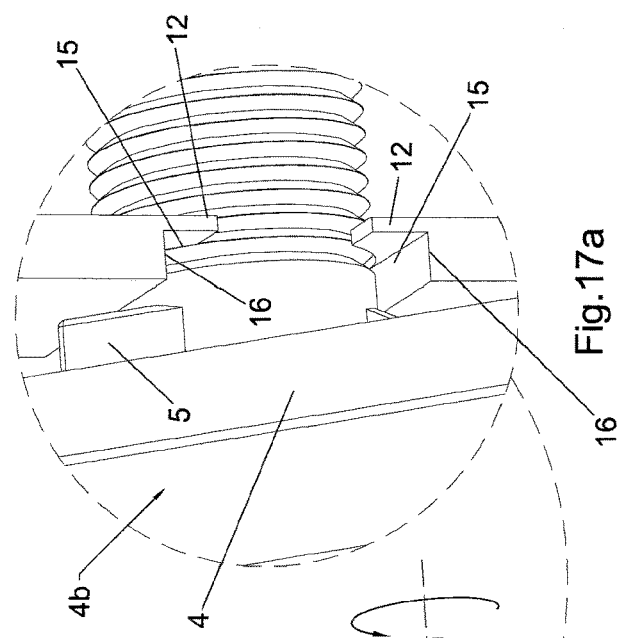
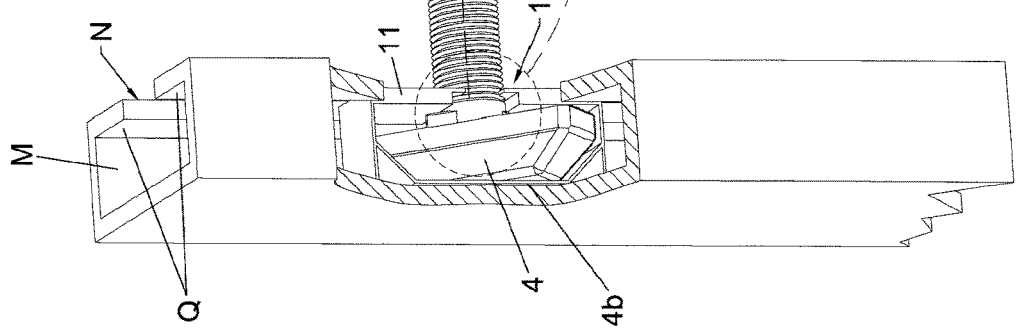
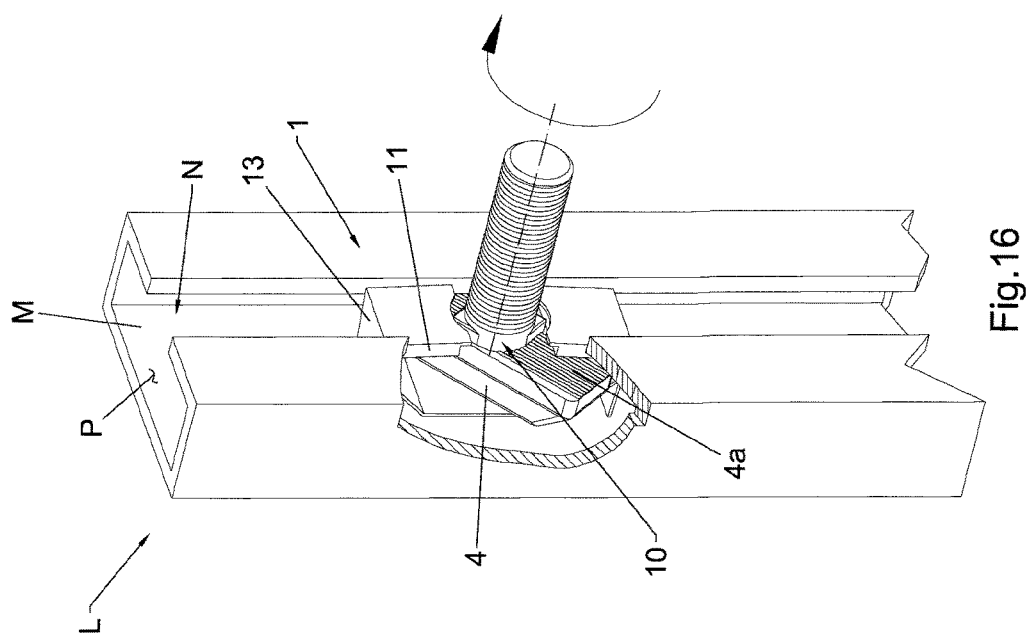

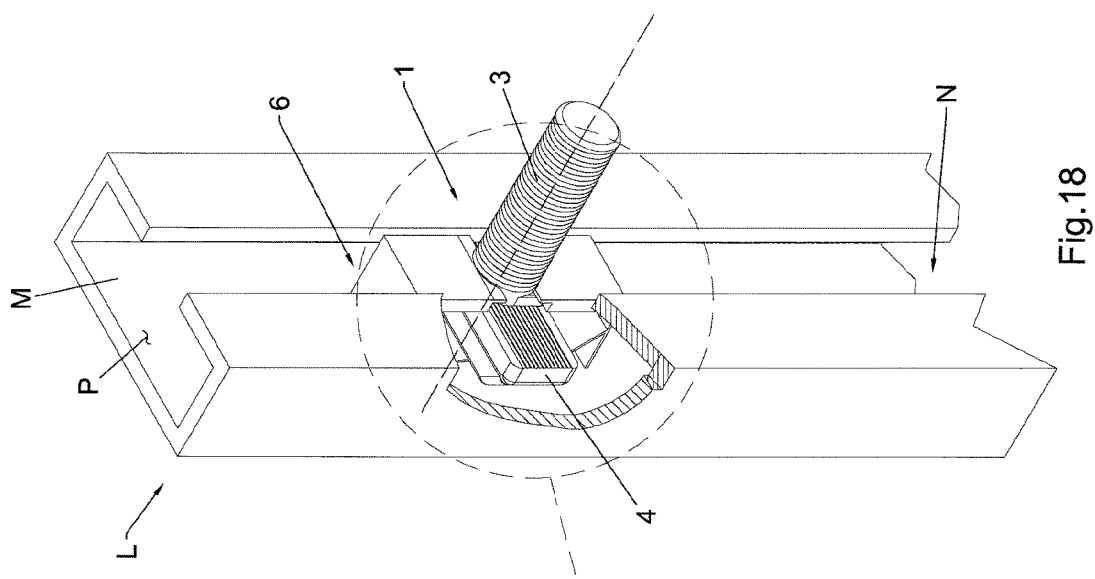
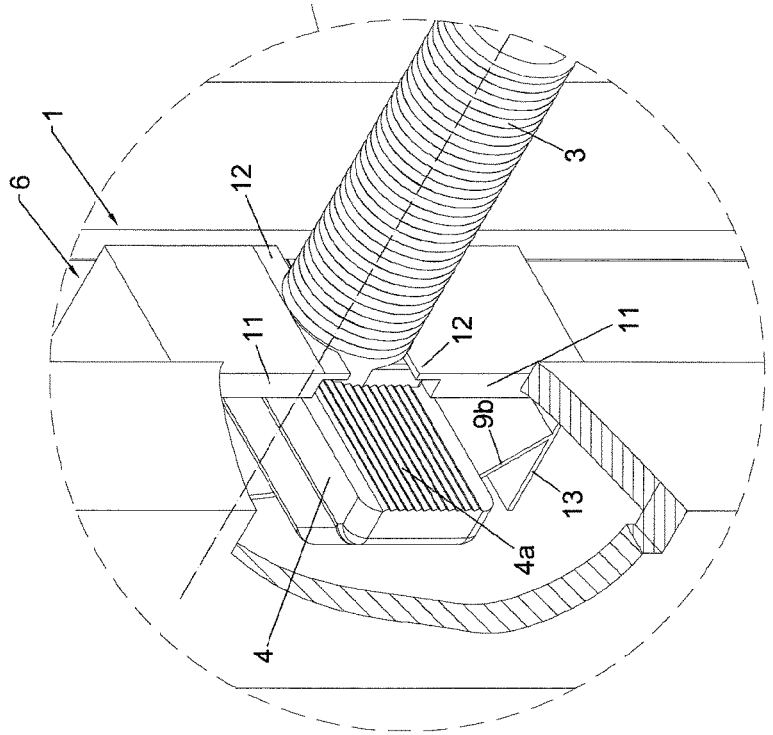
Fig. 18
Fig. 18a

WIRING UNIT FOR GROOVED BARS PROVIDED WITH A T-SHAPED RECESS

BACKGROUND OF THE INVENTION

1. Field of the Invention

The invention regards a cabling unit for grooved bus bars with T-shaped cavity. The cabling unit of the invention may be used for obtaining connections to grooved bus bars belonging to structures of various types.

Preferably, the cabling unit of the invention is most commonly used in electrical cabinets and switchboards where it is used for connecting electrical devices, such as for example switches, disconnectors or other devices, to the grooved bus bars with a T-shaped cavity for the distribution of the electric power.

2. Present State of the Art

The electric power distribution bus bars that are used in electrical cabinets and switchboards are constituted by shaped elements with longitudinal extension, each of which is provided with a T-shaped groove which traverses it length-wise.

According to the prior art, special screws with hammer head are inserted in the groove for fixing—to the bus bars—the terminals of the electrical cables that supply the different components housed in the switchboard or cabinet, such as for example switches, disconnectors, deviators and other electrical devices. A distribution bus bar of the known type is represented by way of example in FIG. 1, in which it is indicated in its entirety with A.

The bus bar is longitudinally traversed by the groove B, which is accessible through the longitudinal slot C and is configured to receive the screw D having the hammer head D1 provided with an elastic element D2.

When mounting the screw D, the operator holds it by the threaded shank D2, arranges it with the hammer head D1 aligned to the slot C and then inserts it into the groove B, as observable in FIG. 2.

In this configuration, the screw cannot be rotated given that, as observable, the lateral walls of the hammer head D1 counteract the walls of the slot C.

Rotating the screw requires forcing the hammer head D1 against the bottom of the groove B so that the compression of the elastic element D3 allows the hammer head D1 to fully enter into the groove B, as observable in FIG. 3, up to freeing the walls thereof from contact with the walls of the slot C.

In such position, the screw D can be rotated in the clockwise direction until it is arranged transversely to the slot C in the position observable in FIG. 4.

Once the rotation is completed, the screw D is released and the expansion of the elastic element D3 pushes the underhead of the screw D counteracting the inner surface of the groove B so that the screw remains constrained in the position observable in FIG. 5.

Thus, the screw D is self-supporting and the operator does not have to support it during fastening for cabling operations.

The presence of reliefs D4 arranged at the underhead, which counteract the wall of the slot C once the rotation has occurred, limits the amplitude of the rotation angle that can be imparted to the screw to 90° and serves as an end stop which prevents any further rotation of the screw D and guarantees the required reaction for fastening the bolt H.

The use of self-supporting screws with a hammer head has the advantage of facilitating the cabling given that, after insertion thereof into the grooves of the bus bars, they remain in position and the operator can work using both hands.

Various types of self-supporting screws with a hammer head and provided with variously shaped elastic elements are available in the market, but they all reveal the known drawback lying in the fact that after being arranged in the self-supporting operating position in the groove B, an inadvertent counter-rotation in the anticlockwise direction easily returns them to the initial configuration of FIG. 3 in which they can project from the groove B.

As a matter of fact, the elastic element that guarantees the self-support of the screw does not provide—against the bottom of the groove B—a friction sufficient to effectively counteract a counter-rotation torsional moment, which may at times be inadvertently caused by the operator when operating the fastening tools.

SUMMARY OF THE INVENTION

The aim of the present invention is to overcome this drawback described now. In particular, the object of the invention is to obtain a cabling unit with grooved bus bars comprising a self-supporting screw with a hammer head and configured to guarantee greater stability to the screw with respect to equivalent screws of the prior art.

Advantageously, the screw of the cabling unit of the invention reveals greater stability against counter-rotation with respect to the prior art.

The object is attained by a cabling unit according to the main claim to which reference shall be made.

Particular characteristics of the cabling unit of the invention are described in the dependent claims.

BRIEF DESCRIPTION OF THE DRAWINGS

The aforementioned object shall be more apparent from the description of the cabling unit of the invention, outlined hereinafter by way of non-limiting example, with reference to the attached drawings, wherein:

FIGS. 1 to 5 represent different views and positions of an electric power distribution bus bar and the relative screw with a hammer head belonging to the prior art;

FIGS. 6 to 8 represent different views of the cabling unit of the invention;

FIGS. 11 to 18 represent different views and positions of the cabling unit of the invention, assembled to a respective grooved bus bar;

FIGS. 13a, 14a, 17a and 18a represent enlarged details of the corresponding figures bearing the same number.

DETAILED DESCRIPTION OF THE PREFERRED EMBODIMENTS

Figures 9, 9A:
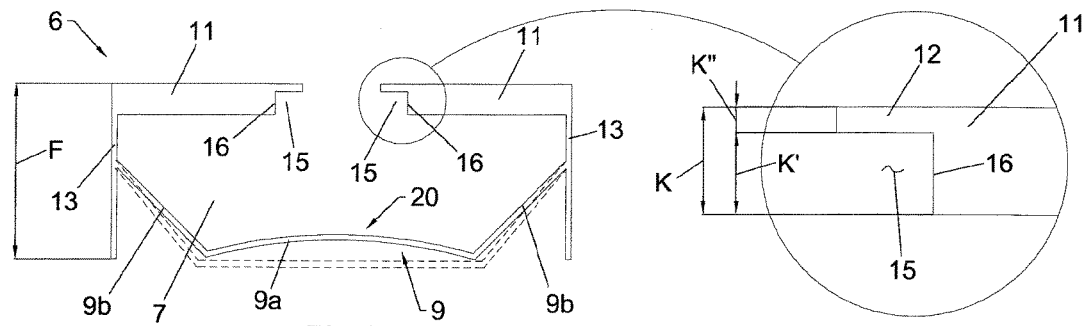
FIGS. 9 and 10 represent different views of a detail of the cabling unit of the invention.
FIG. 9a represents a detail of FIG. 9.

The cabling unit of the invention is represented in FIGS. 6 to 8 where it is indicated with 1 in its entirety.

It is used for connection to grooved bus bars L observable in FIGS. 11 to 18, preferably but not exclusively of the type adapted to transmit electric power, which are installed in electrical cabinets or switchboards.

It is however understood that the cabling unit 1 may be used for connection to grooved bus bars of any type and adapted for any use.

Each grooved bus bar L comprises a longitudinal cavity M accessible through a longitudinal slot N and the cabling unit 1 comprises a screw 2 having a threaded shank 3 provided with a hammer head 4 to which a shaped casing 6 configured to be received in the longitudinal cavity M is associated after insertion through the longitudinal slot N.

The threaded shank 3 is provided with two lateral reliefs 5, radially projecting and diametrically opposite to each other, which are arranged at the underhead surface 4a of the hammer head 4.

In the shaped casing 6 there is identified a shaped housing 7 configured to receive the hammer head, an elastic bottom 9 and a through opening 8 for the threaded shank 3 of the screw 2, arranged on the opposite side of the elastic bottom 9.

When the shaped casing 6 is arranged in the longitudinal cavity M along the slot N and the hammer head 4 of the screw 2 is arranged transversely to the slot N, as observable in FIG. 15, the elastic bottom 9 pushes the hammer head 4 so that the underhead surface 4a thereof counteracts the inner wall Q of the longitudinal cavity M opposite to the bottom P of the latter.

In this position, the screw 2—with the entire cabling unit 1—remains constrained and self-supported in the longitudinal cavity M.

According to the invention, the shaped casing 6 is provided with counteracting means 10 that are configured to cooperate with the lateral reliefs 5 and prevent the counter-rotation of the screw 2 when the hammer head 4 is arranged transversely to the longitudinal slot N.

Figure 10:
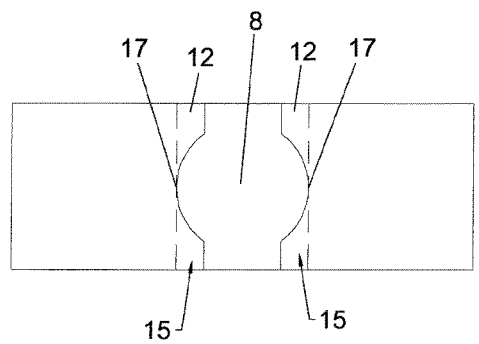

As regards the shaped casing 6, besides the aforementioned elastic bottom 9, it comprises—in particular as observable in FIGS. 9, 9a and 10—two upper walls 11 opposite to the elastic bottom 9 and mutually coplanar and spaced, and two lateral walls 13, each of which connects the elastic bottom 9 to one of the aforementioned upper walls 11.

In this manner, the walls 11 and 13 and the elastic bottom 9 define—for the shaped casing 6—a profile that substantially recalls the shape of the letter "C" and delimits the shaped housing 7 that receives the hammer head 4.

It should also be observed that the upper walls 11 have shaped ends 12 that are juxtaposed to each other and mutually define the through opening 8 for the screw 2.

In particular, in the shaped ends 12 there are the aforementioned counteracting means 10, each of which is defined by an undercut area 15 facing towards the shaped housing 7.

As observable in particular in FIGS. 9, 9a and 10, the undercut area 15 is delimited by a counteracting wall 16 with which a respective lateral relief 5 comes to contact.

The counteracting wall 16 is orthogonal to the upper wall 11 and its height K' is lower than the thickness K of the respective upper wall 11, so that the undercut area 15 is entirely comprised in the thickness K of the upper wall 11.

Thus, each shaped end 12 assumes a strip-like configuration with thickness K" equivalent to the difference between the thickness K of the upper wall 11 and the height K' of the counteracting wall 16.

In addition, each lateral relief 5 is received in the undercut 15 when the elastic bottom 9 of the shaped casing 6 is arranged in an arched fashion and in inoperative position.

Each shaped end 12 also has a concave area 17 belonging to the surface of the corresponding upper wall 11, so that the through opening 8 of the shaped casing 6, in particular observable in the plan view of FIG. 10, is defined by said mutually juxtaposed and spaced concave areas 17.

As regards the lateral walls 13, the length F of each of them is greater than the distance F' measured between the bottom P and the inner wall Q of the longitudinal cavity M so that the shaped casing 6, when housed in the longitudinal cavity M, remains constrained and aligned in the longitudinal slot N by contrast against the walls Na of the latter, as observable in particular in FIGS. 13 to 15.

As regards the elastic bottom 9, it should be observed—particularly in FIGS. 8 and 9—that it comprises an elastic strip 9a, shaped to form a curved profile with the convexity 20 facing towards the upper walls 11 and thus towards the inside of the shaped housing 7.

In addition, it should be observed that the elastic bottom 9 also comprises two elastic membranes 9b each of which connects the elastic strip 9a to a corresponding lateral wall 13.

The elastic membranes 9b are arranged inclined with respect to the upper walls 11 and each of them intersects the lateral wall 13 corresponding thereto in an intermediate area.

In this manner, the elastic bottom 9 has an optimal elasticity so that it can be deformed and arranged according to the configuration represented in a dashed line in FIG. 9 when the operator forces the hammer head 4 against it to constrain the screw 2 to the bus bar L, as described below.

Figures 11, 12:
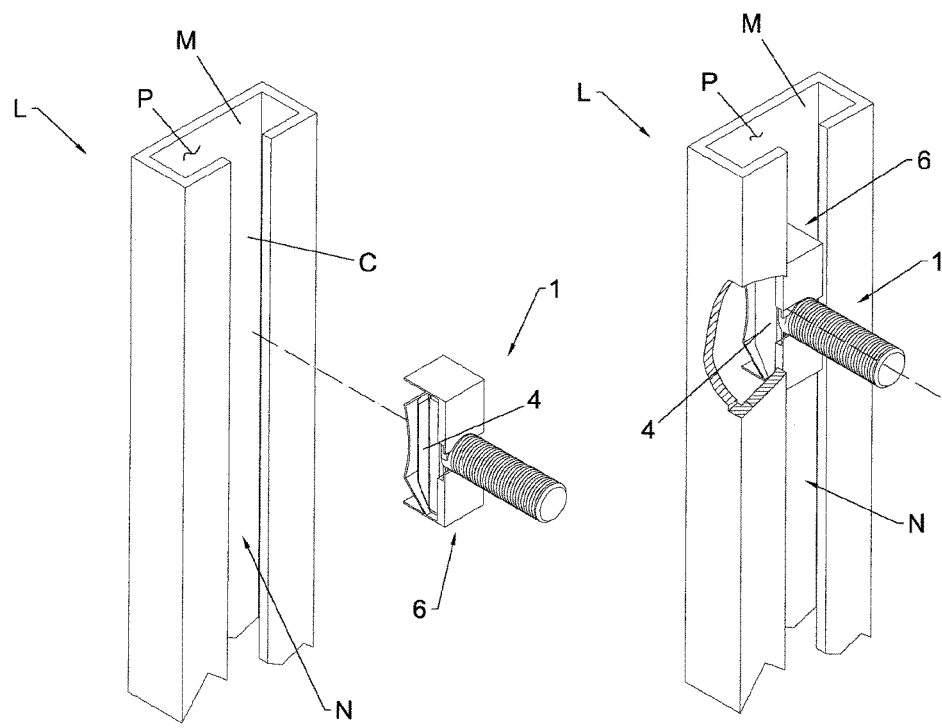

Operatively, when the user wants to constrain the cabling unit 1 to the bus bar L, he inserts the hammer head 4 of the screw 2 into the shaped casing 6 in the configuration observable in FIG. 11 and—through the longitudinal slot N of the bus bar L—arranges the shaped casing 6 with the screw 2 associated thereto in the longitudinal cavity M, as observable in axonometric view in FIG. 12 and in longitudinal sectional view in FIG. 13.

By applying a force S to the shank of the screw 2, the user forces the hammer head 4 against the elastic bottom 9, as observable in FIG. 14, so as to flatten it against the bottom P of the longitudinal cavity M.

In such position, as previously mentioned, the shaped casing 6 counteracts the walls Na of the longitudinal slot N while the lateral reliefs 5 of the screw 2 completely recede into the shaped casing 6, as observable in FIG. 14 and particularly in the detail of FIG. 14a.

As a matter of fact, the distance G measured between the upper walls 11 and the elastic strip 9a—when the latter is adherent to the bottom P of the longitudinal cavity M—is greater than the distance G' measured between the outer surface 4b of the hammer head 4 and the outer surface 5a of the lateral reliefs 5.

In this manner, the shaped casing 6 remains fixed in the position, the lateral reliefs 5 do not contrast against the counteracting walls 16 that delimit the undercut areas 15 of the shaped casing 6 and thus the screw 2 can be rotated in the clockwise direction, as observable in FIG. 16 and in FIG. 17, until it reaches the transversal position with respect to the longitudinal slot N in which, as observable in FIGS. 18 and 18a, the screw 2 is released.

In such position, the thrust exerted by the elastic bottom 9, which returns to the initial arched position, pushes the underhead surface 4a of the hammer head 4 against the inner wall Q of the longitudinal cavity M, as observable in FIG. 15, thus guaranteeing the stability of the screw 2 in the attained position.

FIGS. 18 and 18a show that both the lateral reliefs 5 of the screw 2 remain constrained to the counteracting walls 16 that delimit the undercut areas 15 that house them and thus prevent the screw 2 from being inadvertently counter-rotated in the anticlockwise direction thus returning the entire cabling unit 1 to the initial unstable configuration represented in FIG. 12.

In addition, in the configuration of FIGS. 18 and 18*a*, each lateral relief 5 also counteracts a respective wall Na of the longitudinal slot N, as observable in FIG. 15, and thus prevents any further rotation of the screw 2 in the clockwise direction and serves as a reaction element for the fastening of a bolt.

Thus, the operator may carry out all operations for fastening one bolt to the screw 2 with both hands free and thus not having to worry that the screw 2 may move from the attained position.

Thus, in the light of the above, it is clear that the cabling unit of the invention attains all preset objects.

In the executive step, the cabling unit of the invention may be subjected to modifications and variants not described and represented in the figures, all of which shall be deemed protected by the present patent should they fall within the scope of protection of the claims that follow.

The invention claimed is:

1. A cabling unit for connecting electrical devices to power supply bus bars having at least one longitudinal cavity accessible through a longitudinal slot, said cabling unit comprising:
   a screw having a hammer head and a threaded shank provided with two radially projecting lateral reliefs, diametrically opposite to each other and arranged at an underhead surface of said hammer head;
   a shaped casing configured to be received in said longitudinal cavity through said longitudinal slot and in which there is identified a shaped housing configured to receive said hammer head and provided with an elastic bottom and a through opening for said threaded shank, said elastic bottom being adapted to counteract a bottom of said longitudinal cavity and push said underhead surface of said hammer head against an inner wall of said longitudinal cavity opposite to said bottom to constrain said screw to said power supply bus bar when a rotation imparted to said screw arranges said hammer head transversely to said longitudinal slot, said shaped casing being provided with:
      counteracting means for cooperating with said lateral reliefs to prevent the counter-rotation of said screw when said hammer head is arranged transversely to said shaped casing and said longitudinal slot;
      two upper walls opposite to said elastic bottom and mutually coplanar and spaced, having the mutually juxtaposed shaped ends that define said through opening, said counteracting means being present in said shaped ends; and
      two lateral walls each of which connects said elastic bottom to one of said upper walls, said walls and said elastic bottom being adapted to define, for said shaped casing, a profile that substantially recalls the shape of the letter "C" and delimits said shaped housing that receives said hammer head;
   wherein the counteracting means comprises a pair of undercut areas each of which is obtained in a respective shaped end, is faced towards said shaped housing, is delimited by a counteracting wall orthogonal to said upper wall and is configured to cooperate at contact with said lateral reliefs when said hammer head is arranged transversely to said shaped casing.

2. The cabling unit according to claim 1, wherein said counteracting wall is orthogonal to said upper wall and it has a height lower than the thickness of the respective upper wall, said shaped end having a strip-like configuration projecting from said upper wall and having a thickness equal to the difference between the thickness of said upper wall and the height of said counteracting wall.

3. The cabling unit according to claim 1, comprising a concave area obtained in each of said shaped ends and coplanar to the corresponding upper wall, said concave areas of said mutually juxtaposed shaped ends being adapted to define said through opening.

4. The cabling unit according to claim 1, wherein the length of each of said lateral walls is greater than the distance between said bottom and said inner wall of said longitudinal cavity.

5. The cabling unit according to claim 1, wherein said elastic bottom comprises an elastic strip shaped according to a curved profile having a convexity facing towards said upper walls.

6. The cabling unit according to claim 5, wherein the distance measured between said upper walls and said elastic strip, when said elastic strip is arranged adherent to said bottom of said longitudinal cavity, is greater than the distance measured between the outer surface of said hammer head and the outer surface of said lateral reliefs.

7. The cabling unit according to claim 5, wherein said elastic bottom comprises two elastic membranes each one of which connects said elastic strip to a corresponding lateral wall.

8. The cabling unit according to claim 7, wherein said elastic membranes are arranged inclined with respect to said upper walls and each of said elastic membranes intersects the lateral wall corresponding thereto in an intermediate area.

9. The cabling unit according to claim 1, wherein each of said lateral walls is orthogonal to the respective upper wall.

10. A cabling unit for connecting electrical devices to power supply bus bars having at least one longitudinal cavity accessible through a longitudinal slot, said cabling unit comprising:
   a screw having a hammer head and a threaded shank provided with two radially projecting lateral reliefs, diametrically opposite to each other and arranged at an underhead surface of said hammer head;
   a shaped casing configured to be received in said longitudinal cavity through said longitudinal slot and in which there is identified a shaped housing configured to receive said hammer head and provided with an elastic bottom and a through opening for said threaded shank, said elastic bottom being adapted to counteract a bottom of said longitudinal cavity and push said underhead surface of said hammer head against an inner wall of said longitudinal cavity opposite to said bottom to constrain said screw to said power supply bus bar when a rotation imparted to said screw arranges said hammer head transversely to said longitudinal slot, said shaped casing being provided with:
      counteracting means for cooperating with said lateral reliefs to prevent the counter-rotation of said screw when said hammer head is arranged transversely to said shaped casing and said longitudinal slot;
      two upper walls opposite to said elastic bottom and mutually coplanar and spaced, having the mutually juxtaposed shaped ends that define said through opening, said counteracting means being present in said shaped ends; and
      two lateral walls each of which connects said elastic bottom to one of said upper walls, said walls and said elastic bottom being adapted to define, for said shaped casing, a profile that substantially recalls the shape of the letter "C" and delimits said shaped housing that receives said hammer head;

further comprising a concave area obtained in each of said shaped ends and coplanar to the corresponding upper wall, said concave areas of said mutually juxtaposed shaped ends being adapted to define said through opening.

11. A cabling unit for connecting electrical devices to power supply bus bars having at least one longitudinal cavity accessible through a longitudinal slot, said cabling unit comprising:

a screw having a hammer head and a threaded shank provided with two radially projecting lateral reliefs, diametrically opposite to each other and arranged at an underhead surface of said hammer head;

a shaped casing configured to be received in said longitudinal cavity through said longitudinal slot and in which there is identified a shaped housing configured to receive said hammer head and provided with an elastic bottom and a through opening for said threaded shank, said elastic bottom being adapted to counteract a bottom of said longitudinal cavity and push said underhead surface of said hammer head against an inner wall of said longitudinal cavity opposite to said bottom to constrain said screw to said power supply bus bar when a rotation imparted to said screw arranges said hammer head transversely to said longitudinal slot, said shaped casing being provided with:

counteracting means for cooperating with said lateral reliefs to prevent the counter-rotation of said screw when said hammer head is arranged transversely to said shaped casing and said longitudinal slot;

two upper walls opposite to said elastic bottom and mutually coplanar and spaced, having the mutually juxtaposed shaped ends that define said through opening, said counteracting means being present in said shaped ends; and two lateral walls each of which connects said elastic bottom to one of said upper walls, said walls and said elastic bottom being adapted to define, for said shaped casing, a profile that substantially recalls the shape of the letter "C" and delimits said shaped housing that receives said hammer head;

wherein said elastic bottom comprises an elastic strip shaped according to a curved profile having a convexity facing towards said upper walls and two elastic membranes each one of which connects said elastic strip to a corresponding lateral wall.

\* \* \* \* \*